Sept. 12, 1961     E. KNIEPKAMP ET AL     2,999,707

FLEXIBLE JOINT

Filed Nov. 27, 1957

United States Patent Office 2,999,707
Patented Sept. 12, 1961

2,999,707
FLEXIBLE JOINT
Ernest Kniepkamp, Heilbronn (Neckar), and Franz Gottfried Reuter, Lemforde, Hannover, Germany, assignors, by mesne assignments, to Mobay Chemical Company, Pittsburgh, Pa., a corporation of Delaware
Filed Nov. 27, 1957, Ser. No. 699,354
Claims priority, application Germany Nov. 28, 1956
1 Claim. (Cl. 287—85)

This invention relates generally to supports and, more particularly, to a novel means for fastening a motor or prime mover to a support.

It has been proposed heretofore to provide a flexible support for a motor or other prime mover having a plurality of metal parts with a layer of rubber lying therebetween to provide some flexibility in the support. The life of the rubber is relatively short so an effort has been made to prolong the life by embedding metal in the rubber usually in the form of a reinforcing frame. The heretofore disclosed supports always subject the rubber element to extreme load conditions, and consequently it is frequently necessary to dismount the motor and replace the rubber support.

It is an object of this invention to provide a novel flexible support for a motor to avoid the foregoing disadvantages. Another object of the invention is to provide a means for fastening a motor or other prime mover to a supporting structure which is flexible and easily assembled and disassembled. Still another object of the invention is to provide a flexible means for fastening and supporting a motor or prime mover on a floor or the like, having an improved service life and being easily dismantled. A still further object of the invention is to provide a novel resilient ring-like supporting element.

Figure 1:
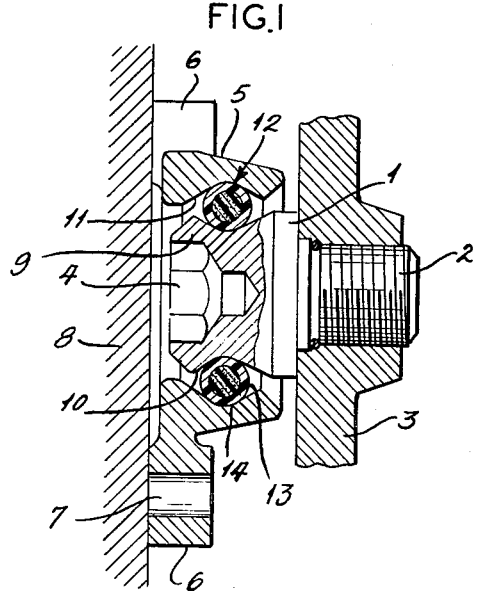
Figure 2:
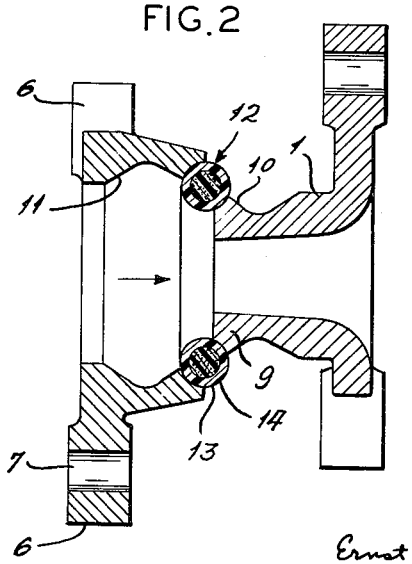

Other objects will become apparent from the following description with reference to the accompanying drawing in which FIGURE 1 is an illustration of one embodiment of the invention showing a resilient ring-like member in cross-section lying between cooperating metal parts which attach a prime mover to a support; and FIGURE 2 is another illustration of the embodiment of FIGURE 1 showing how one part is assembled with the other.

Generally speaking, the foregoing objects and others are accomplished in accordance with this invention by providing a novel, resilient O-ring or ring-like structure having a substantially circular or elliptically shaped cross-section with a core of cellular rubber-like polyurethane plastic and an adherent rubber-like substantially non-porous polyurethane cover. The invention further contemplates a combination of members, one attached to a motor and the other forming a support secured to a supporting structure. The two members of the combination are fastened together by means of the novel O-ring provided by this invention.

The O-ring or ring-shaped member provided by this invention cooperates with the metal parts of the support to provide a flexible joint which secures the motor or prime mover against movement relative to the supporting structure and is of such construction that it can be assembled or disassembled without difficulty. The cooperating parts of the motor and the support are constructed in such a way that they have tapered opposing surfaces with the direction of taper converging and diverging in the direction of the predominant spring action. Such a construction provides for a longer spring course in the one direction than in the direction at right angles thereto and can be varied by varying the angle of the taper.

Referring now to the drawing for a detailed description of one embodiment of the invention, a support for a motor is illustrated with a resilient member lying between a protuberance on the motor and a matching female support adapted to be attached to a supporting structure. More particularly, FIGURE 1 is an illustration of a means for attaching a motor through a flange member 3 which may be integral with the base of the motor. Flange 3 has a threaded bore, and plug 1 is threadably mounted by means of threads 2 in the bore of flange 3. Plug 1 protrudes from flange 3 and fits within the support. The head of plug 1 is provided with a socket 4 to be used for screwing the plug into a flange 3. Head 9 of plug 1 has converging, diverging tapered sides 10. In other words, the twin tapered sides of plug 1 are of gradually decreasing diameter as you move from flange 3 towards the exposed extremity of the plug and then the diameter begins to increase as you move further in the opposite direction thus providing a plug wherein the minimum diameter thereof is substantially centraly located with respect to the thickness of the plug. The support is a tapered casing 5 having a flange 6 and flange hole 7. A suitable bolt or other means for fastening this support to a supporting structure 8 may be inserted through hole 7. The inner wall of casing 5 is also machined to have a twin taper. This twin taper 11 corresponds to the twin taper of plug 1. Plug 1 is of somewhat lesser diameter than the inner diameter of casing 5 and an elliptical space is provided between the twin tapered surface of plug 1 and the twin tapered surface of casing 5. A resilient O-ring 12 having a core 14 of rubber-like cellular polyurethane and an adherent cover 13 of rubber-like substantially non-porous polyurethane having a diameter greater than the maximum diameter of the space between the twin tapered surfaces is compressed between the tapered surfaces.

The embodiment of FIGURE 1 is illustrated in FIGURE 2 in a disassembled position. O-ring 12 lies on the top of casing 5 and about the tapered end portion of head 9 of plug 1. Casing 5 is moved in the direction of the arrow of FIGURE 2 and as it moves over and about head 9, ring 12 rotates and is rolled into a position lying between the twin tapered surfaces of plug 9 and casing 5. It is thus apparent that the two parts 1 and 5 can be assembled together relatively easily. The two parts can likewise be disassembled by pulling flange member 1 out of the space in casing 5. In this operation, ring 12 also rolls or rotates and facilitates movement of one part with respect to the other.

The novel O-ring provided by this invention is prepared by casting a reaction mixture of an organic polyisocyanate and an organic compound having at least two reactive hydrogen atoms which will react together to form a cellular product. This cellular ring is then coated with a layer of a rubber-like substantially non-porous polyurethane plastic which has also been prepared from a reaction mixture of an organic polyisocyanate and an organic compound having at least two reactive hydrogen atoms but which will not produce a porous structure. The rubber-like polyurethane coating may be prepared by any suitable process, such as, for example, those disclosed in U.S. Patent 2,620,516; 2,621,166; 2,729,618; 2,764,565 and 2,778,810.

The following Example 1 is an illustration of one method of making an homogeneous or substantially non-porous polyurethane rubber adapted for making the coating:

*Example 1*

1,000 parts by weight of an hydroxyl polyester obtained by thermal esterification of about 11 mols of adipic acid with about 12 mols of ethylene glycol and having an hydroxyl number of about 52 and an acid number of about 1 are heated at a temperature of about 135° C. and under a vacuum of about 12 mm. until the formation of bubbles has stopped and the polyester is completely free from water. Now 300 parts by weight of naphthylene-1,5-diisocyanate are added at 135° C. to the dehydrated polyester while stirring. As soon as the temperature starts to drop, 70 parts by weight of butylene glycol-1,4 are stirred into the mixture at about 135° C. The resulting mixture is poured into a mold and maintained therein at a temperature of about 110° C. for about 24 hours to form a homogeneous polyurethane rubber.

The following method may be used for preparing the cellular polyurethane rubber used for the core of the O-ring provided by this invention:

Example 2

1,000 parts by weight of an hydroxyl polyester obtained by thermal esterification of about 11 mols of adipic acid with about 12 mols of ethylene glycol and having an hydroxyl number of about 52 and an acid number of about 1 are heated at a temperature of about 135° C. and under a vacuum of about 12 mm. until the formation of bubbles has stopped and the polyester is completely free from water. Now, 200 parts by weight of naphthylene-1,5-diisocyanate are added to the dehydrated polyester at 135° C. while stirring. As soon as the temperature starts to drop, 20 parts of butylene glycol-1,4 are stirred into the mixture within a period of one minute at about 130° C. and subsequently 6 parts by weight of water are added while stirring. The resulting mixture forms a foamed or cellular polyurethane rubber on standing and is cured at a temperature of about 110° C. for about 24 hours. A suitable O-ring may be cut from the cellular product by any suitable process. This O-ring may then be placed in a mold of slightly greater dimensions and a rubber-like plastic such as is obtained from Example 1 may be poured around the O-ring core and then cured to form an adherent coating. In accordance with another embodiment of the invention, the cellular core may be coated by adhesively binding a layer of rubber-like substantially non-porous polyurethane therein. Any suitable adhesive, such as, for example, a rubber base adhesive or isocyanate modified polyester may be used. Moreover, an isocyanate alone may be used as an adhesive.

It is to be understood that the foregoing examples are merely representative of the type of processes that may be used for making the cellular polyurethane rubber and for making the substantially non-porous-like polyurethane rubber coating. Any suitable organic compound having at least two reactive hydrogens, such as, for example, a polyalkylene ether glycol, a polyester amide or other suitable saturated or unsaturated polyester prepared by condensation of a dicarboxylic acid and polyhydric alcohol, may be substituted for the hydroxy polyester of the foregoing examples. Preferably the organic compound having at least two reactive hydrogens should have a molecular weight of at least about 1000 and a hydroxyl number not greater than about 112. The acid number of the polyester is preferably 0 to 2. Likewise, any other suitable organic polyisocyanate including those disclosed in the foregoing patents may be substituted for the diisocyanate used in the examples. It is pointed out, however that in preparing the cellular polyurethane rubber both water and an organic cross-linking agent must be used. Such a polyurethane has urea linkages formed by reaction of water with NCO groups and urethane linkages formed by reaction of NCO groups with OH groups of the organic cross-linker. Any of the organic cross-linking agents disclosed in the foregoing patents may be used in combination with the water. In preparing the non-porous polyurethane rubber only an organic chain extender or cross-linker such as, butylene glycol-1,4 or one of the organic chain extenders disclosed in the aforesaid patents is preferred. If water is to be used as a cross-linking agent in preparing the non-porous rubber, the product must be milled to remove any carbon dioxide formed in the reaction in order that the product will be substantially non-porous. It is preferred in preparing the cellular core to use from about 9 to about 90 percent water as the cross-linking agent with the balance being a suitable organic cross-linking agent, such as ethylene glycol or the like. It should therefore be apparent that the invention in its broadest aspects contemplates an O-ring having any cellular polyurethane core prepared with both water and an organic chain extender or cross-linker and any rubber-like substantially non-poous polyurethane cover. Preferably, however, the core will have a density of from about 30 to about 50 pounds per cubic foot. The cover will preferably have a density of from about 1.1 to about 1.5 grams per cubic centimeter.

Although the invention has been described in considerable detail in the foregoing for the purpose of illustration, it is to be understood that such detail is solely for this purpose and that variations can be made by those skilled in the art without departing from the spirit and scope of the invention except as is set forth in the claim.

What is claimed is:

A flexible joint adapted to fasten a motor and the like to a supporting structure which comprises a protuberance adapted to be secured to a motor, said protuberance having diverging and converging tapered surfaces, a casing adapted to be secured to a supporting structure, said casing circumscribing said protuberance and having converging and diverging tapered surfaces in a direction opposite to that of said protuberance surfaces, to form an elliptical space between said protuberance and said casing and between said tapered surfaces within said elliptical space, a compressed O-ring having a cellular polyurethane plastic core and a rubber-like substantially non-porous polyurethane plastic external surface, said O-ring having a substantially circular cross section.

References Cited in the file of this patent

UNITED STATES PATENTS

| | | |
|---|---|---|
| 2,082,348 | Le Tarte | June 1, 1937 |
| 2,115,713 | Haire | May 3, 1938 |
| 2,271,058 | Binns | Jan. 27, 1942 |
| 2,382,784 | Emery | Aug. 14, 1945 |
| 2,717,025 | Jelinek | Sept. 6, 1955 |
| 2,721,084 | Weiss | Oct. 18, 1955 |
| 2,728,541 | Hansel | Dec. 27, 1955 |
| 2,753,642 | Sullivan | July 10, 1956 |
| 2,819,063 | Neidhart | Jan. 7, 1957 |
| 2,877,503 | Puderbaugh | Mar. 17, 1959 |
| 2,881,995 | Neher | Apr. 14, 1959 |

FOREIGN PATENTS

| | | |
|---|---|---|
| 151,751 | Switzerland | Mar. 16, 1932 |
| 749,541 | Germany | May 30, 1956 |

OTHER REFERENCES

"British Plastics," January 1956 (pp. 5 to 9 and 39 relied upon). (Copy in division 15, Class 18–48S.)